United States Patent Office 3,635,910
Patented Jan. 18, 1972

3,635,910
POLYAMIDES CONTAINING PHOSPHONAMIDE
Stanley Albert Sills and Hugh Foster, Pontypool, England, assignors to Imperial Chemical Industries Limited, London, England
No Drawing. Filed May 5, 1969, Ser. No. 822,012
Claims priority, application Great Britain, May 14, 1968, 22,885/68
Int. Cl. C08g 20/38
U.S. Cl. 260—78 R    9 Claims

ABSTRACT OF THE DISCLOSURE

A polyamide derived from a dicarboxylic acid and a diamine, a lactam or aminocarboxylic acid or polyamide forming derivative thereof and containing at least 25 parts per million (expressed as phosphorus) of a phosphonamide having the formula:

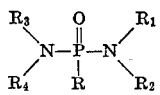

where R is aliphatic, cycloaliphatic, aromatic or —$NR_5R_6$; $R_1$, $R_2$, $R_3$, $R_4$, and $R_5$ are H, aliphatic, cycloaliphatic, aromatic or form part of a heterocyclic group in which the nitrogen also forms part of the heterocyclic structure, and $R_6$ is aliphatic, cycloaliphatic, aromatic or forms part of a heterocyclic group in which the nitrogen also forms part of heterocyclic structure. The thus modified polyamide gives fibers which show increased dye-uptake together with improved elastic recovery and initial modulus after treatment with boiling water.

---

The present invention relates to polyamides having improved properties obtained by the addition of phosphonamides.

It is known that the molecular weight, dye-uptake and physical properties, including tensile properties of polyamides can be modified by the incorporation, either by co-polymerisation or straight forward addition, of other substances chemically distinct from the polyamide precursors. Thus the anti-static properties of polyamide may be improved by the addition of polyethylene glycol, preferably by co-polymerisation.

We have now found that the physical, mechanical and dyeing properties of polyamides can be modified in a controlled and desirable manner by the incorporation therein of certain phosphonamides. Thus fibres spun from the modified polyamides may show increased dye-uptake together with improvements in elastic recovery and inital modulus after treatment with boiling water. Also the modified polyamides show an increase in relative viscosity when prepared in the same manner as the unmodified polymer.

Accordingly therefore, the present invention provides a modified polyamide derived from a dicarboxylic acid and a diamine, a lactam or aminocarboxylic acid or polyamide forming derivative thereof and containing at least 25 parts per million (expressed as phosphorus) of a phosphonamide having the formula:

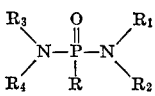

where R is aliphatic, cycloaliphatic, aromatic or —$NR_5R_6$; $R_1$, $R_2$, $R_3$, $R_4$, and $R_5$ are H, aliphatic, cycloaliphatic, aromatic or from part of a heterocyclic group in which the nitrogen also forms part of the heterocyclic structure, and $R_6$ is aliphatic, cycloaliphatic aromatic or forms part of a heterocyclic group in which the nitrogen also forms part of heterocyclic structure.

The phosphonamide preferably has the formula:

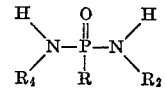

where R, $R_2$ and $R_4$ have the meaning ascribed above. Desirably the aliphatic groups should not contain more than 12 carbon atoms in the carbon chain.

The aliphatic, cycloaliphatic and aromatic groups may be subzstituted if desired.

The concentration of the phosphonamide is preferably at least 100 parts per million (expressed as phosphorous).

The invention does not include phosphoamides which form part of a dimeric phophorus amide.

The invention includes films, moulded articles and especially fibres, both staple and continuous filaments, formed from the above defined polyamides.

Suitable phosphonamides for the incorporation of polyamide according to the present invention include;

Phenyl phosphonicdiamide (P.P.A.)—$C_6H_5P(O)(NH_2)_2$
Phenyl phosphonic N N' diphenylamide—
  $C_6H_5P(O)(NHC_6H_5)_2$
Phenyl phosphonic N N' ditertiarybutylamide—
  $C_6H_5P(O)(NH\text{-}tC_4H_9)_2$
Phenyl phosphonic N N' -di-2 pyridine amide—
  $C_6H_5P(O)(NHC_5H_4N)_2$
Phenyl phosphonic dimorpholide—
  $C_6H_5P(O)(NC_4H_8O)_2$
Phosphoryl trianilide—$PO(NHC_6H_5)_3$
Phosphoryl tri(2 methylanilide)—$PO(NHC_6H_4CH_3)_3$
Phosphoryl tri(cyclohexylamide)—$PO(NHC_6H_{11})_3$
Phosphoryl tri(benzylamide)—$PO(NHCH_2C_6H_5)_3$ Suitable polyamides include:

Polyhexamethylene adipamide
Polyepsilon caprolactam
Polyhexamethylene suberamide and copolymers thereof.

In addition to the phosphonamides the polyamides may contain mono-function compounds in small quantity, such as monoamines and monobasic acids, for example acetic acid, to control the degree of polymerisation. Such monofunctional compounds are known as viscosity stabilisers. In the preparation of the modied co-polyamides of this invention employing a diamine and a di-carboxylic acid as the polyamide forming reactants the degree of polymerisation may be controlled by using a suitable excess of the diamine or di-carboxylic acid. Other additives may be incorporated in the modified polyamides at any convenient stage of their preparation, for example, dyestuffs, pigments, dyestuff-formers, plasticisers, delustrants, antioxidants, light stabilisers and so on.

The phophonamide may be added to the polyamide forming reactants or melt before, during or after the polymerisation. Preferably the phosphonamide is added at some convenient stage during the polymerisation process.

Fibres may be obtained from the polymers of this invention by the usual melt spinning processes without any significant increase in spinning or drawing difficulties caused, for example, by the presence of degraded polymer.

The increase in relative viscosity obtained by the addition of phosphonamides to certain polyamides, for example, polyhexamethylene adipamide, may be utilised to obtain fibres which take up relatively large amounts of anionic dyestuffs, usually referred as ultra deep dyeing fibres. Thus increased amounts of excess hexamethylene diamine, when used as a stabiliser, may be employed without loss of relative viscosity compared with the unmodified polymer.

The invention is illustrated by the following examples.

EXAMPLES 1 AND 2

Polyhexamethylene adipamide polymer containing 0.3% $TiO_2$ and various levels of phenylphosphonic diamide were prepared in an autoclave. Acetic acid was added to give a final relative viscosity of about 40. Properties of the polymers are given in Table 1, the phenylphosphonic diamide content being expressed in parts per million (p.p.m.) of phosphorus.

TABLE 1

| Example | Phosphorus, p.p.m. | R.V. | A.E.G., g. eq./$10^6$ g. | C.E.G., g. eq./$10^6$ g. | Gel time |
|---|---|---|---|---|---|
| Control | 0 | 36.0 | 48.8 | 72 | 1,100 |
| 1 | 100 | 40 | 46.1 | 65 | 1,065 |
| 2 | 200 | 43 | 40.6 | 74 | 978 |

The above polymers were melt spun to yield a 210 denier 20 filament undrawn yarn using standard 6.6 nylon melt spinning equipment. An oil in water emulsion spinning finish was applied to the filaments before being wound up as a yarn. Subsequently the yarn was drawn to yield 60/20 yarn. Properties of the yarns are given in Table 2.

TABLE 2

| Example | Initial modulus, g./d./100% ext. A.B.W. | Elastic recovery (percent) 5% ext. A.B.W. | Elastic recovery (percent) 1% ext. A.B.W. | Bending recovery, percent |
|---|---|---|---|---|
| Control | 15 | 87 | 91 | 35 |
| 1 | 21 | 91 | 98 | 40 |
| 2 | 19 | 90 | 99 | 38 |

NOTE.—A.B.W.=After boiling water treatment.

Improved anti-static properties were shown by the yarns containing 100 or 200 p.p.m. phosphorus as phenyl phosphonic diamide, lower electrical resistance on the drawn yarn and more rapid charge decay on undrawn yarns being obtained as shown by Table 3.

TABLE 3

| Example | Electrical resistance, megohms $\times 10^8$ at 39% relative humidity 26° C. drawn yarn | Charge decay time in minutes to constant charge |
|---|---|---|
| Control | 0.84 | 22 |
| 1 | 0.49 | 3 |
| 2 | 0.33 | 4 |

The rate of charge decay was measured by taking a finish-free undrawn yarn and electrically charging the yarn by running it at a slow speed over a metal guide prior to passing it through a cylindrical electrostatic charge detector. The latter was connected to a recorder and electrometer. When a sufficient charge level was developed, the yarn was stopped and the amount of initial charge and the charge at subsequent time intervals recorded.

The time in minutes was plotted against $$\log_e \frac{V_o}{V_t}$$

where $V_o$=initial charge and $V_t$ the charge at time $t$. The slope of the straight line obtained is the time constant $k$ in minutes recorded in the above table.

The yarns from Examples 1 and 2 were dyed to equilibrium in Solway Blue BN at pH 7.0. The depth of dyeing increased through Examples 1 and 2 and all yarns were classed as deep dyeing in contrast to the normal dyeing of the control yarns.

EXAMPLE 3

Polyhexamethylene adipamide polymers containing 0.3% $TiO_2$ and 1 mole percent excess hexamethylene diamine were prepared with and without the addition of 300 p.p.m. phenylphosphonic diamide (expressed as p.p.m. phosphorus) and compared with a control. Properties of the polymers are given in Table 4.

TABLE 4

| Example | R.V. | A.E.G., g. eq./$10^6$ g. | C.E.G., g. eq./$10^6$ g. |
|---|---|---|---|
| Control | 47.2 | 60.2 | 62 |
| 1 mole percent excess HMD | 38.3 | 105.9 | 40 |
| 3. (1 mole percent excess HMD plus PPA (300 p.p.m. P)) | 48.6 | 92.2 | 43 |

Yarns spun from the polymer of Example 3 and the polymer containing excess HMD only showed ultra deep dyeing characteristics when dyed to equilibrium in Solway Blue BN at pH 8.0, the former retaining, however, the relative viscosity of the control sample which was only faintly dyed under these conditions.

EXAMPLE 4

Polyepsilon caprolactam containing 300 p.p.m. phosphorus as phenyl phosphonic diamine and the control polymer without phenyl phosphonic diamide was prepared from epsilon caprolactam in an autoclave. Polymer properties are shown in Table 5.

TABLE 5

| Example | R.V. | A.E.G., g. eq./$10^6$ g. | C.E.G., g. eq./$10^6$ g. |
|---|---|---|---|
| Control | 53.9 | 59.2 | 30 |
| 4 | 61.4 | 48.9 | 45 |

A sample of the modified polymer dyed to equilibrium in Solway Blue BN at pH 8.0 had deep dyeing characteristics.

EXAMPLE 5

Polyhexamethylene suberamide containing 300 p.p.m. phosphorus as phenyl phosphonic diamide was prepared by polymerization in a Carius tube. Hexamethylene diammonium suberate and phenyl phosphonic diamide were heated in a sealed tube for 2 hours at 220° C. followed by one hour under atmospheric steam at 290° C. as a thin film. Properties of the polymer are given in Table 6.

TABLE 6

| Example | R.V. | A.E.G., g. eq./$10^6$ g. | C.E.G., g. eq./$10^6$ g. |
|---|---|---|---|
| Control | 52.1 | 36.6 | 83 |
| 5 | 54.9 | 33.2 | 88 |

Again the modified polymer had deep dyeing characteristics when dyed to equilibrium with Solway Blue BN at pH 8.0.

EXAMPLE 6

Polyhexamethylene adipamide containing 300 p.p.m. phosphorus as phenyl phosphonic N-N' diphenylamide was prepared in a Carius tube in the manner described in Example 5. Properties of the modified polymer are shown in Table 7.

TABLE 7

| Example | R.V. | A.E.G., g. eq./$10^6$ g. | C.E.G., g. eq./$10^6$ g. |
|---|---|---|---|
| Control | 47.2 | 60.2 | 62 |
| 6 | 59.2 | 49.2 | 67 |

The modified polymer of Example 6 again exhibited deep dyeing characteristics with Solway Blue BN at pH 8.0.

EXAMPLE 7

The polymer of Example 6 was prepared in an autoclave by the method described in Example 1. Acetic acid was added as a viscosity stabiliser to give polymers having a relative viscosity of about 40. The resultant polymers were spun and drawn to yield a 60/20 yarn. Properties of the polymers and yarns are given in Tables 8 and 9.

TABLE 8

| Example | R.V. | A.E.G., g. eq./10⁶ g. | C.E.G., g. eq./10⁶ g. |
|---|---|---|---|
| Control | 36.0 | 48.8 | 72 |
| 7 | 45.5 | 45.7 | 81 |

TABLE 9

| Example | Initial modulus A.B.W. g./d./100% ext. | Elastic recovery, percent 5% ext. A.B.W. | Elastic recovery, percent 1% ext. A.B.W. | Bending modulus | Charge decay time count (mins.) |
|---|---|---|---|---|---|
| Control | 14.6 | 87 | 91 | 6 | 26 |
| 7 | 21.2 | 90 | 99 | 11 | 2 |

Note.—A.B.W. After boiling water treatment.

The yarn of Example 7 exhibited improved anti-static behaviour compared with that of the control yarn.

EXAMPLE 8

Polyhexamethylene adipamide containing 300 p.p.m. phosphorus as phenyl phosphonic N N'-ditertiarybutyl-amide was prepared as in Example 5. Properties of the polymer are given in Table 10.

TABLE 10

| Example | R.V. | A.E.G., g. eq./10⁶ g. | C.E.G., g. eq./10⁶ g. |
|---|---|---|---|
| Control | 47.2 | 60.2 | 62 |
| 8 | 55.8 | 47.1 | 71 |

The modified polymer exhibited deep dyeing characteristics with Solway Blue BN at a pH of 8.0.

EXAMPLE 9

Polyhexamethylene adipamide containing 300 p.p.m. phosphorus as phenyl phosphonic N N'-di-2-pyridine amide was prepared in a manner described in Example 5. Properties of the polymer are given in Table 11.

TABLE 11

R.V ........................................ 56.4
A.E.G., g. eq./10⁶ g ...................... 46.6
C.E.G., g. eq./10⁶ g ...................... 63

Again the modified polymer exhibited deep dyed characteristics with Solway Blue BN at a pH of 8.0.

EXAMPLES 10–15

A series of polyhexamethylene adipamide polymers containing phosphoryl triamides were prepared by adding the phosphoryl triamide to the hexamethylene diammonium adipate salt and polymerising the mixture in a sealed Carius tube according to the method given in Example 5. Details of the additives and polymer properties are given in Table 12.

TABLE 12

| Example | Phosphoryl triamide | Phosphorus, p.p.m | R.V. | A.E.G., g. eq./10⁶ g. | C.E.G., g. eq./10⁶ g. |
|---|---|---|---|---|---|
| Control | | | 47.2 | 60.2 | 62 |
| 10 | Trianilide | 300 | 56.3 | 52.8 | 73 |
| 11 | do | 500 | 56.6 | 49.9 | 74 |
| 12 | Tri(2-methyl anilide) | 200 | 61.0 | 53.7 | 60 |
| 13 | do | 500 | 57.6 | 51.7 | 75 |
| 14 | Tri(cyclo hexylamide) | 500 | | 67.1 | 64 |
| 15 | Tri(cyclo benzylamide) | 500 | 33.4 | 72.3 | 61 |

When spun into yarn all the examples exhibited deeper dyeing characteristics than the control when dyed to equilibrium in Solway Blue BN at pH 7.0–8.0.

An ultra deep-dye polymer was obtained by the addition of 1 mole of excess hexamethylene diamide to a polymer containing 200 p.p.m. P as phosphoryltrianilide without a significant drop in R.V. compared with the control.

EXAMPLES 16–22

A series of polyhexamethylene adipamide polymers containing phosphonamides included in the present invention were prepared by adding the phosphonamide to the hexamethylene diammonium adipate salt and polymerising the mixture in a sealed Carius tube according to the method of Example 5. Details of the phosphonamides and polymer properties are given in Table 13.

TABLE 13

| Example | Phosphoryltriamide | Phosphorus, p.p.m. | R.V. | A.E.G., g. eq./10⁶ g. | C.E.G., g. eq./10⁶ g. |
|---|---|---|---|---|---|
| Control | | | 47.2 | 60.2 | 62 |
| 16 | Phenyl phosphonic dimorpholide | 500 | 54.4 | 48.9 | 69 |
| 17 | Phenyl phosphonic di NN'-cyclohexylamide | 300 | 49.5 | 50.7 | 66 |
| 18 | Phenyl phosphonic di NN'-octylamide | 500 | 45.8 | 55.7 | 63 |
| 19 | Phosphoryl tri-(t-butyl amide) | 200 | 60.7 | 53.0 | 60 |
| 20 | Phosphoryl tri-(2-pyridine amide) | 200 | 60.5 | 51.0 | 63 |
| 21 | Phosphoryl trimorpholide | 200 | 58.1 | 56.6 | 53 |
| 22 | Cyclohexyl phosphonic dianilide | 100 | 57.4 | 53.2 | 60 |

When spun into yarn all polymers had deeper dyeing characteristics than the control sample when dyed to equilibrium in Solway Blue BN at pH 7.0–8.0.

EXAMPLE 23

A series of polyhexamethylene adipamide polymers containing varying proportions of phenyl phosphonic NN' diphenylamide were prepared by adding phenyl phosphonic NN' diphenyl amide to the hexamethylene diammonium adipate salt and polymerising the mixture in a sealed Carius tube according to the method given in Example 5. Polymer properties are given in Table 14.

TABLE 14

| Phosphonamide | Phosphorus (p.p.m.) | R.V. | A.E.G., g. eq./10⁶ g. | C.E.G., g. eq./10⁶ g. |
|---|---|---|---|---|
| Control | 0 | 51.0 | 58.2 | 57 |
| Phenyl phosphonic NN¹ diphenylamide | 25 | 55.0 | 55.9 | 60 |
|  | 50 | 54.1 | 54.9 | 63 |
|  | 75 | 55.4 | 55.1 | 59 |

EXAMPLE 24

A series of polyhexamethylene adipamide polymers containing varying proportions of phosphoryl tri-2-pyridine amide were prepared by adding phosphoryl tri-2-pyridine amide to the hexamethylene diammonium adipate salt and polymerising the mixture in a sealed Carius tube according to the method given in Example 5. Polymer properties are given in Table 15.

TABLE 15

| Phosphonamide | Phosphorus (p.p.m.) | R.V. | A.E.G., g. eq./10⁶ g. | C.E.G., g. eq./10⁶ g. |
|---|---|---|---|---|
| Control | 0 | 51.0 | 58.2 | 57 |
| Phosphoryl tri-2-pyridine amide | 25 | 62.3 | 51.6 | 54 |
|  | 50 | 62.0 | 51.2 | 54 |
|  | 75 | 59.7 | 72.2 | 60 |

The dyeing characteristics of the polymers from Examples 23 and 24 were essentially the same as those of the control examples. Although at the low levels of phosphorus employed in these examples deep dye yarns were not obtained, there was, nevertheless, a significant increase in the relative viscosity polymers compared with the control polymer.

What we claim is:

1. A composition consisting essentially of a fiber-forming polyamide of a saturated aliphatic dicarboxylic acid and a saturated aliphatic diamine, lactam or aminocarboxylic acid or polyamide forming derivatives thereof and containing at least 25 parts per million (expressed as phosphorus) of a phosphonamide having the formula:

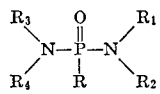

where R is hydrocarbon or $-NR_5R_6$ and $R_1$, $R_2$, $R_3$, $R_4$, $R_5$ are H, hydrocarbon or together with the nitrogen to which they are attached form a heterocyclic ring structure, and $R_6$ is hydrocarbon or together with the nitrogen to which they are attached form a heterocyclic ring structure.

2. A composition according to claim 1 containing at least 100 parts per million and not more than 500 parts per million (expressed as phosphorus) of the phosphonamide.

3. A composition according to claim 2 wherein the phosphonamide is selected from the group consisting of phenyl phosphonicdiamide, phenyl phosphonic NN' diphenylamide, phenyl phosphonic NN' ditertiarybutylamide, phenyl phosphonic NN'-di-2 pyridine amide, phenyl phosphonic dimorpholide, phosphoryl trianilide, phosphoryl tri (2 methylanilide), phosphoryl tri (cyclohexylamide), and phosphoryl tri(benzylamide).

4. A composition according to claim 2 wherein the polyamide is polyhexamethylene adipamide.

5. A composition according to claim 2 wherein the polyamide is polyepsilon caprolactam or polyhexamethylene suberamide.

6. A fiber or filament prepared by spinning the composition of claim 1.

7. A film prepared from the composition of claim 1.

8. A composition according to claim 1 wherein $R_1$ and $R_3$ are hydrogen.

9. A composition according to claim 1 wherein the hydrocarbon substituents in R, $R_1$, $R_2$, $R_3$, $R_4$, $R_5$ and $R_6$ contain no more than 12 carbon atoms in the carbon chain.

References Cited
UNITED STATES PATENTS 2,557,808  6/1951  Walker _____ 260—78
3,344,107  9/1967  Miller _____ 260—78

HAROLD D. ANDERSON, Primary Examiner

U.S. Cl. X.R.

57—140 R; 260—78 A, 78 L, 78 S, Dig 16